US012692075B2

(12) United States Patent
Zhang et al.

(10) Patent No.: US 12,692,075 B2
(45) Date of Patent: Jul. 28, 2026

(54) GOODS SORTING SYSTEM AND METHOD, AND ROBOT

(71) Applicant: Beijing Geekplus Technology Co., Ltd., Beijing (CN)

(72) Inventors: Wei Zhang, Beijing (CN); Ming Ye, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 398 days.

(21) Appl. No.: 18/284,806

(22) PCT Filed: Apr. 7, 2022

(86) PCT No.: PCT/CN2022/085586
§ 371 (c)(1),
(2) Date: Sep. 28, 2023

(87) PCT Pub. No.: WO2022/218206
PCT Pub. Date: Oct. 20, 2022

(65) Prior Publication Data
US 2024/0375871 A1 Nov. 14, 2024

(30) Foreign Application Priority Data

Apr. 13, 2021 (CN) .......................... 202110393442.7
Apr. 13, 2021 (CN) .......................... 202120752125.5

(51) Int. Cl.
*B65G 1/137* (2006.01)
*B65G 1/04* (2006.01)
*G06Q 10/0875* (2023.01)

(52) U.S. Cl.
CPC ........... *B65G 1/137* (2013.01); *B65G 1/0407* (2013.01); *G06Q 10/0875* (2013.01)

(58) Field of Classification Search
CPC ... B65G 1/137; B65G 1/0407; G06Q 10/0875
See application file for complete search history.

(56) References Cited

U.S. PATENT DOCUMENTS 9,327,952 B1 * 5/2016 Kolharkar ............ B65G 1/0435
10,683,171 B2 * 6/2020 Jarvis ................... G05D 1/0234
(Continued)

FOREIGN PATENT DOCUMENTS

CN 105858045 A 8/2016
CN 109689536 A 4/2019
(Continued)

OTHER PUBLICATIONS

Chinese First Office Action regarding Application No. 202110393442. 7, dated Dec. 14, 2024.
(Continued)

*Primary Examiner* — Kyle O Logan
(74) *Attorney, Agent, or Firm* — Cozen O'Connor

(57) ABSTRACT

Provided are a goods sorting system, a goods sorting method, and a robot. The goods sorting system includes a sorting and storage area, a sorting robot, a bin transport robot, and a control server. The sorting and storage area has at least one shelf. The shelf includes a first storage area provided with sorting and storage positions and a second storage area. The control server is configured to determine a target sorting and storage position where sorted goods are to be stored in the first storage area based on sorted goods information, dispatch the sorting robot to deliver sorted goods into a bin corresponding to the target sorting and storage position, and in a case a sorting task has been completed for the bin in the first storage area, dispatch the bin transport robot to transport the bin to an empty storage position in the second storage area.

18 Claims, 7 Drawing Sheets

(56) References Cited

U.S. PATENT DOCUMENTS

| | | | | |
|---|---|---|---|---|
| 11,427,405 B1 * | 8/2022 | Theobald | ............. | B65G 1/0492 |
| 2017/0225891 A1 * | 8/2017 | Elazary | ................ | G05D 1/0234 |
| 2018/0127211 A1 * | 5/2018 | Jarvis | ................... | B65G 1/1373 |
| 2018/0127212 A1 * | 5/2018 | Jarvis | ..................... | G05D 1/247 |
| 2020/0317450 A1 | 10/2020 | Parrott et al. | | |
| 2020/0324972 A1 * | 10/2020 | Cheng | ................. | B65G 1/0435 |

FOREIGN PATENT DOCUMENTS

| | | | |
|---|---|---|---|
| CN | 109911503 A | 6/2019 | |
| CN | 110516991 A | 11/2019 | |
| CN | 110633926 A | 12/2019 | |
| CN | 210504200 U | 5/2020 | |
| CN | 211003009 U | 7/2020 | |
| CN | 111589719 A | 8/2020 | |
| CN | 112215557 A | 1/2021 | |
| CN | 112371518 A | 2/2021 | |
| CN | 212550534 U | 2/2021 | |
| CN | 112591359 A | 4/2021 | |
| CN | 113102260 A | 7/2021 | |
| CN | 221753988 U | 9/2024 | |
| WO | 2017216127 A1 | 12/2017 | |

OTHER PUBLICATIONS

International Search Report (English and Chinese) and Written Opinion (Chinese) of the ISA issued in PCT/CN2022/085586, mailed Jun. 29, 2022; ISA/CN.

* cited by examiner

15

152

151-2

152

151-2

152

151-2

152

151-2

152

151-1

153-2

153-2

153-2

153-1

13

$t_2$ $t_1$

12

121-1

12

GOODS SORTING SYSTEM AND METHOD, AND ROBOT

CROSS-REFERENCE TO RELATED APPLICATIONS

This application is the national phase of International Application No. PCT/CN2022/085586, titled "ARTICLE SORTING SYSTEM AND METHOD, AND ROBOT", filed on Apr. 7, 2022, which claims priority to Chinese Patent Application No. 202110393442.7 filed on Apr. 13, 2021 and Chinese Patent Application No. 2021207521255 filed on Apr. 13, 2021, which are incorporated herein by reference in their entirety.

TECHNICAL FIELD

The present disclosure relates to the technical field of warehousing management, and in particular to a goods sorting system and method, and a robot.

BACKGROUND

Scenarios of goods sorting include returned goods sorting and order sorting. The so-called returned goods sorting refers to the scenario of sorting of goods returned by a customer, and the so-called order sorting refers to the scenario of sorting of goods according to a user order. In a returned goods processing process, it includes links such as warehousing-in, sorting, shelving-on, storage, shelving-off and warehousing-out of goods to be returned. In an order processing process, it includes links such as warehousing-in, sorting, shelving-on, storage, shelving-off and warehousing-out of goods to be picked. Traditional sorting methods include pure manual operation and semi-automatic operation.

Since the types of equipment used for processing each link in the above two scenarios are different, each link is split and divided, and the sorting efficiency of the overall sorting process is reduced. Moreover, the splitting of each link also increases the difficulty of warehouse management, thus reducing the sorting efficiency of goods. In addition, each link occupies part of warehouse area exclusively. Since goods returning frequency is much lower than the sorting frequency of goods in normal orders, the returned goods sorting scenario occupies the warehouse area exclusively, which will increase the logistics cost of returned goods sorting.

SUMMARY

Embodiments of the present disclosure at least provide a goods sorting system and method, and a robot.

In a first aspect, an embodiment of the present disclosure provides a goods sorting system, including a sorting and storage area, a sorting robot, a bin transport robot and a control server. At least one shelf is provided in the sorting and storage area; at least one storage position is provided on the shelf for storing a bin; the shelf includes a first storage area and a second storage area; the first storage area is provided with a sorting and storage position; and the control server is configured to determine a target sorting and storage position where sorted goods are to be stored in the first storage area based on sorted goods information, dispatch the sorting robot to deliver the sorted goods into a bin corresponding to the target sorting and storage position, and in a case that a sorting task has been completed for the bin in the first storage area of the shelf, dispatch the bin transport robot to transport the bin for which the sorting task has been completed in the first storage area to an empty storage position in the second storage area.

In some embodiments, the control server is further configured to, in a case that it is determined to replenish a bin to an empty sorting and storage position in the first storage area, dispatch the bin transport robot to transport an empty bin from the second storage area to the sorting and storage position to which the bin is to be replenished in the first storage area.

In some embodiments, the control server is further configured to, in a case that it is determined to perform a shelving-on operation on a bin outside the shelf, dispatch the bin transport robot to transport the bin outside the shelf to the empty storage position in the second storage area.

In some embodiments, the control server is further configured to, in a case that it is determined that a bin to be shelved-off exists in the shelf, dispatch the bin transport robot to transport the bin to be shelved-off to a position outside the shelf.

In some embodiments, the sorted goods include goods to be returned; and the control server is configured to determine a target sorting and storage position where the goods to be returned are to be stored in the first storage area based on sorted goods information of the goods to be returned and actual occupation information of the sorting and storage position in the first storage area, and dispatch the sorting robot to deliver the goods to be returned into the bin corresponding to the target sorting and storage position.

In some embodiments, the sorted goods include goods to be picked; the goods sorting system further includes an item supply mechanism; and the control server is further configured to determine initial position information of the goods to be picked based on sorted goods information of the goods to be picked, dispatch the bin transport robot to transport a bin where the goods to be picked are located to the item supply mechanism based on the initial position information, and dispatch the item supply mechanism to place the goods to be picked onto the sorting robot.

In some embodiments, the initial position information includes one or more of position information of a storage position in the second storage area and other areas outside the sorting and storage area.

In some embodiments, the control server is further configured to, after the target sorting and storage position is determined, in a case that no bin is placed at the target sorting and storage position, determine position information of an empty bin in the second storage area, and dispatch the bin transport robot to transport the empty bin from the second storage area to the target sorting and storage position based on the position information of the empty bin in the second storage area.

In some embodiments, the bin to be shelved-off contains goods to be destroyed; the bin to be shelved-off is located at a storage position in the second storage area; and the control server is configured to, in a case that it is determined to destroy the goods to be destroyed, determine position information of the bin to be shelved-off where the goods to be destroyed are located, and dispatch the bin transport robot to transport the bin to be shelved-off to other storage areas outside the sorting and storage area based on the position information of the bin to be shelved-off.

In some embodiments, the bin to be shelved-off includes a bin to be warehoused-out on the shelf.

In some embodiments, the first storage area includes a bottommost storage area of the shelf; and the second storage area includes other storage areas except the bottommost storage area of the shelf.

In a second aspect, an embodiment of the present disclosure further provides a robot, including the sorting robot in the first aspect.

In a third aspect, an embodiment of the present disclosure further provides a robot, including the bin transport robot in the first aspect.

In a fourth aspect, the present disclosure further provides a goods sorting method applied to the control server of the goods sorting system in the first aspect; and the goods sorting method includes:

determining the target sorting and storage position where the sorted goods are to be stored in the first storage area based on sorted goods information;

dispatching the sorting robot to deliver the sorted goods into the bin corresponding to the target sorting and storage position; and in a case that the sorting task has been completed for the bin in the first storage area of the shelf, dispatching the bin transport robot to transport the bin for which the sorting task has been completed in the first storage area to the empty storage position in the second storage area.

In some embodiments, the goods sorting method further includes:

in a case that it is determined to replenish a bin to the empty sorting and storage position in the first storage area, dispatching the bin transport robot to transport the empty bin from the second storage area to the sorting and storage position to which the bin is to be replenished in the first storage area.

In some embodiments, the goods sorting method further includes:

in a case that it is determined to perform a shelving-on operation on the bin outside the shelf, dispatching the bin transport robot to transport the bin outside the shelf to the empty storage position in the second storage area.

In some embodiments, the goods sorting method further includes:

in a case that it is determined that the bin to be shelved-off exists in the shelf, dispatching the bin transport robot to transport the bin to be shelved-off to the position outside the shelf.

In some embodiments, the sorted goods include the goods to be returned; and the goods sorting method includes:

determining the target sorting and storage position where the goods to be returned are to be stored in the first storage area based on sorted goods information of the goods to be returned and actual occupation information of the sorting and storage position in the first storage area; and dispatching the sorting robot to deliver the goods to be returned into the bin corresponding to the target sorting and storage position.

In some embodiments, the sorted goods include the goods to be picked; the goods sorting system further includes the item supply mechanism; and before determining the target sorting and storage position where the sorted goods are to be stored in the first storage area based on sorted goods information, the method further includes:

determining initial position information of the goods to be picked based on sorted goods information of the goods to be picked;

dispatching the bin transport robot to transport the bin where the goods to be picked are located to the item supply mechanism based on the initial position information; and dispatching the item supply mechanism to place the goods to be picked onto the sorting robot.

In some embodiments, the initial position information includes one or more of position information of the storage position in the second storage area and other areas outside the sorting and storage area.

In some embodiments, the goods sorting method further includes:

after the target sorting and storage position is determined, in a case that no bin is placed at the target sorting and storage position, determining position information of the empty bin in the second storage area; and dispatching the bin transport robot to transport the empty bin from the second storage area to the target sorting and storage position based on the position information of the empty bin in the second storage area.

In some embodiments, the bin to be shelved-off contains goods to be destroyed; the bin to be shelved-off is located at a storage position in the second storage area; and in a case that it is determined that a bin to be shelved-off exists in the shelf, the dispatching the bin transport robot to transport the bin to be shelved-off to the position outside the shelf includes:

in a case that it is determined to destroy the goods to be destroyed, determining position information of the bin to be shelved-off where the goods to be destroyed are located; and dispatching the bin transport robot to transport the bin to be shelved-off to other storage areas outside the sorting and storage area based on the position information of the bin to be shelved-off.

In some embodiments, the bin to be shelved-off includes the bin to be warehoused-out on the shelf.

In some embodiments, the first storage area includes the bottommost storage area of the shelf; and the second storage area includes other storage areas except the bottommost storage area of the shelf.

In a fifth aspect, an embodiment of the present disclosure further provides a computer-readable storage medium storing computer-readable instructions, and when the instructions in the storage medium are executed by a processor, the goods sorting method in the fourth aspect is implemented.

In a sixth aspect, an embodiment of the present disclosure further provides a computer program product including computer program codes, and when the computer program codes run on a computer, the goods sorting method in the fourth aspect is executed.

In a seventh aspect, an embodiment of the present disclosure provides a computer program including computer program codes, and when the computer program codes run on a computer, the computer executes the goods sorting method in the fourth aspect.

Embodiments of the present disclosure provide a goods sorting system and method, and a robot. The goods sorting system includes a sorting and storage area, a sorting robot, a bin transport robot, and a control server. At least one shelf is provided in the sorting and storage area. At least one storage position is provided on the shelf for storing a bin. The shelf includes a first storage area and a second storage area. The first storage area is provided with a sorting and storage position. The control server is configured to determine a target sorting and storage position where sorted goods are to be stored in the first storage area based on sorted goods information, dispatch the sorting robot to deliver the sorted goods into a bin corresponding to the target sorting and storage position, and in a case that a sorting task has been completed for the bin in the first storage area of the shelf, dispatch the bin transport robot to transport the bin for which the sorting task has been completed in the first storage area to the empty storage position in the second storage area. By dispatching the sorting robot and the bin transport robot to integrate split links in the sorting scenarios, that is, using the sorting robot to realize sorting of goods and using the bin transport robot to realize warehousing-in, shelving-on, storage, shelving-off and warehousing-out of goods, the sorting efficiency of the overall sorting process can be improved. Moreover, the control server dispatches the sorting robot and the bin transport robot separately, thus achieving the automation of various links of the sorting process, reducing the difficulty of warehouse management and further improving the sorting efficiency of goods. In addition, the sorting robot and the bin transport robot can be used in the same sorting and storage area to complete the above sorting process, thus avoiding the situation that the returned goods sorting scenario occupies part of warehouse area exclusively, i.e., the sorting and storage area, and reducing the logistics cost of returned goods sorting.

In order to make the purposes, features and advantages of the present disclosure more obvious and understandable, detailed description will be made below in combination with exemplary embodiments with reference to the drawings.

BRIEF DESCRIPTION OF THE DRAWINGS

In order to describe the technical solutions of the embodiments of the present disclosure more clearly, the drawings required in the embodiments will be briefly described below. The drawings are incorporated into the description and form a part of the description. These drawings illustrate embodiments that comply with the present disclosure and are used together with the description to describe the technical solutions of the present disclosure. It is to be understood that the following drawings only illustrate some embodiments of the present disclosure, and therefore should not be regarded as limitations on the scope. Those skilled in the art may obtain other relevant drawings according to these drawings without contributing any inventive labor.

DETAILED DESCRIPTION

Figure 1:
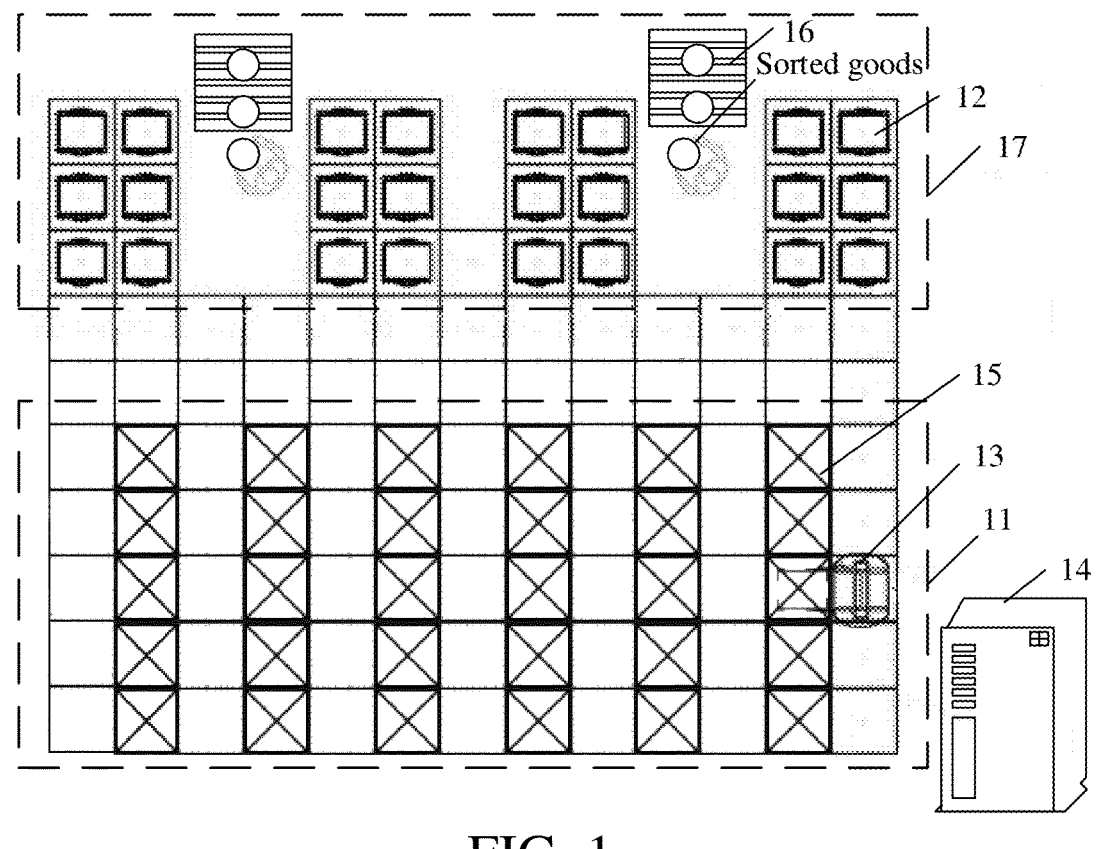
FIG. 1 illustrates a schematic diagram of a goods sorting system according to an embodiment of the present disclosure.

To make the purposes, technical solutions and advantages of the embodiments of the present disclosure clearer, the technical solutions in the embodiments of the present disclosure will be clearly and completely described below with reference to the drawings in the embodiments of the present disclosure. Apparently, the described embodiments are merely some rather than all of the embodiments of the present disclosure. The components of the embodiments of the present disclosure, usually described and illustrated in the drawings herein, may be disposed and designed in various different configurations. Therefore, the following detailed description of the embodiments of the present disclosure provided in the drawings is not intended to limit the scope of the protection of the present disclosure, but only to describe the selected embodiments of the present disclosure. All other embodiments obtained by those skilled in the art based on the embodiments of the present disclosure without contributing any inventive labor still fall within the scope of the protection of the present disclosure.

In addition, terms such as "first" and "second" in the description, claims and drawings of the embodiments of the present disclosure are used for distinguishing similar objects, instead of describing a specific order or sequence. It is to be understood that the data used in this way may be interchanged in appropriate cases, so that the embodiments described here can be implemented in order other than the content illustrated or described here.

The term "a plurality of or several" mentioned herein refers to two or more. The term "and/or" describes the association relationship of associated objects, representing that there may be three relationships. For example, A and/or B may represent that A exists alone, A and B exist simultaneously, and B exists alone. The character '/' generally represents that associated objects are in an 'or' relationship.

For the convenience of understanding the embodiments of the present disclosure, the following definitions are first made for the terms mentioned in the embodiments of the present disclosure, including:

1. returned goods sorting, which refers to a scenario of sorting of goods to be returned in a returned order;
2. order sorting, which refers to a scenario of sorting of goods to be picked in a user order;
3. sorting and storage area, which refers to a partial area in a warehouse where various processing links in goods sorting scenario are integrated together;
4. sorting robot, which refers to a robot used for sorting goods in a sorting and storage area; and
5. bin transport robot, which refers to a robot used for transporting bins in a sorting and storage area.

As found by research, scenarios of goods sorting include returned goods sorting and order sorting. The so-called returned goods sorting refers to the scenario of sorting of goods returned by a customer, and the so-called order sorting refers to the scenario of sorting of goods according to a user order. In a returned goods processing process, it includes links such as warehousing-in, sorting, shelving-on, storage, shelving-off and warehousing-out of goods to be returned. In an order processing process, it includes links such as warehousing-in, sorting, shelving-on, storage, shelving-off and warehousing-out of goods to be picked. Traditional sorting methods include pure manual operation and semi-automatic operation. Since the types of equipment used for processing each link in the above two scenarios are different, each link is split and divided, and the sorting efficiency of the overall sorting process is reduced. Moreover, the splitting of each link also increases the difficulty of warehouse management, thus reducing the sorting efficiency of goods. In addition, each link occupies part of warehouse area exclusively. Since goods returning frequency is much lower than the sorting frequency of goods in normal orders, the returned goods sorting scenario occupies the warehouse area exclusively, which will increase the logistics cost of returned goods sorting.

Based on the research, the present disclosure provides a goods sorting system and method, and a robot. By dispatching the sorting robot and the bin transport robot to integrate split links in the sorting scenarios, that is, using the sorting robot to realize sorting of goods and using the bin transport robot to realize warehousing-in, shelving-on, storage, shelving-off and warehousing-out of goods, the sorting efficiency of the overall sorting process can be improved. Moreover, the control server dispatches the sorting robot and the bin transport robot separately, thus achieving the automation of various links of the sorting process, reducing the difficulty of warehouse management and further improving the sorting efficiency of goods. In addition, the sorting robot and the bin transport robot can be used in the same sorting and storage area to complete the above sorting process, thus avoiding the situation that the returned goods sorting scenario occupies part of warehouse area exclusively, i.e., the sorting and storage area, and reducing the logistics cost of returned goods sorting.

The defects of the above solutions are all the results of the practice and careful study of the inventor. Therefore, the discovery process of the above problems and the solutions proposed in the present disclosure below should all be regarded as contributions made by the inventor to the present disclosure.

It is to be understood that similar reference signs and letters represent similar items in the following drawings. Therefore, once an item is defined in one drawing, it does not need to be further defined or explained in subsequent drawings.

Referring to FIG. 1, it illustrates a schematic diagram of a goods sorting system according to an embodiment of the present disclosure. The goods sorting system includes a sorting and storage area 11, a sorting robot 12, a bin transport robot 13 and a control server 14. At least one shelf 15 is provided in the sorting and storage area 11.

Figure 2:
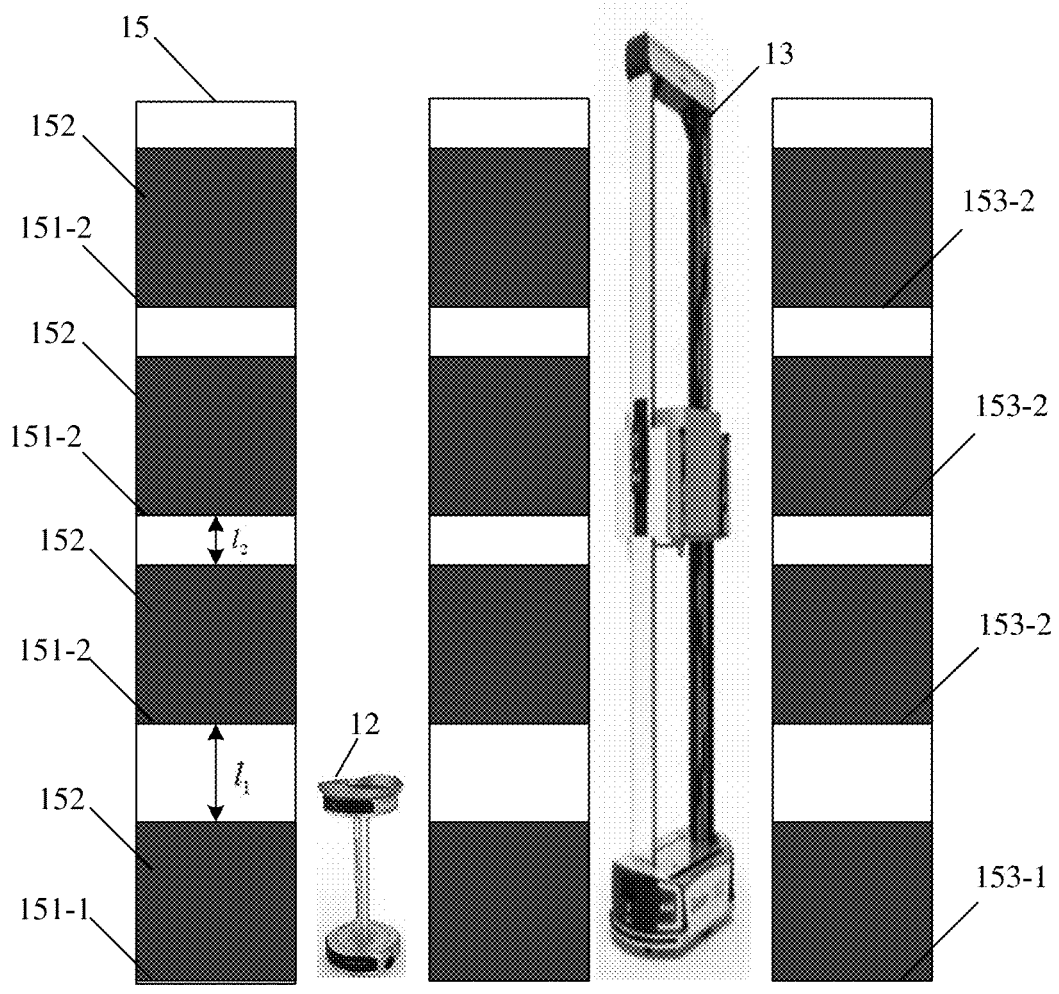
FIG. 2 illustrates a schematic structural diagram of a single-row shelf according to an embodiment of the present disclosure.
Figures 3, 4A:
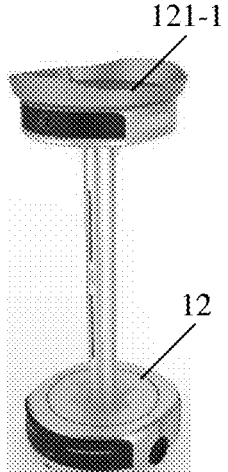
FIG. 3 illustrates a schematic structural diagram of a dual-row shelf according to an embodiment of the present disclosure.
FIG. 4a illustrates a schematic structural diagram of a sorting robot according to an embodiment of the present disclosure.

Referring to FIG. 2, it illustrates a schematic structural diagram of a single-row shelf according to an embodiment of the present disclosure. At least one storage position 151 is provided on the shelf 15. The storage position 151 is used for storing a bin 152. The shelf 15 includes a first storage area 153-1 and a second storage area 153-2. The first storage area 153-1 is provided with a sorting and storage position 151-1. The second storage area 153-2 is provided with a storage position 151-2. It is to be understood that the same shelf has different storage layers, and the vertical distance between the storage layer where the sorting and storage position in the first storage area 153-1 is located and an adjacent storage layer $l_1$ is greater than the vertical distance between adjacent storage layers in the second storage area 153-2.$l_2$ Further referring to FIG. 3, it illustrates a schematic structural diagram of a dual-row shelf according to an embodiment of the present disclosure. It is to be understood that the layout form of shelves in this embodiment of the present disclosure may be tailored to specific application scenarios. For example, a multi-row shelf may also be provided. The multi-row shelf may be formed by a plurality of single-row shelves arranged in parallel. As shown in FIG. 3, the dual-row shelf is formed by two shelves arranged in parallel. The specific layout form of shelves in the warehouse is not limited in this embodiment of the present disclosure.

Figure 4B:
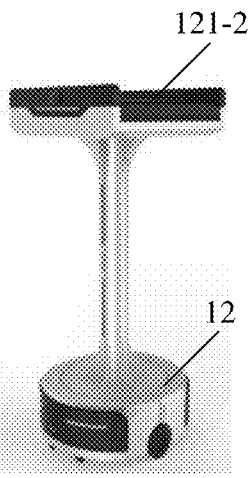
FIG. 4b illustrates a schematic structural diagram of another sorting robot according to an embodiment of the present disclosure.

In some embodiments, referring to FIG. 4a, it illustrates a schematic structural diagram of a sorting robot. In a case that the sorting robot 12 is provided with a delivery mechanism 121, the first storage area 153-1 is a bottommost storage area of the shelf; the second storage area 153-2 is other storage areas except the bottommost storage area of the shelf, as shown in FIG. 2. Here, the delivery mechanism 121 is used for temporarily storing sorted goods provided by an item supply mechanism 16. The delivery mechanism 121 may be provided as a flipping mechanism 121-1, as shown in FIG. 4a. Alternatively, it may be provided as a belt mechanism 121-2, as shown in FIG. 4b.

Figure 5:
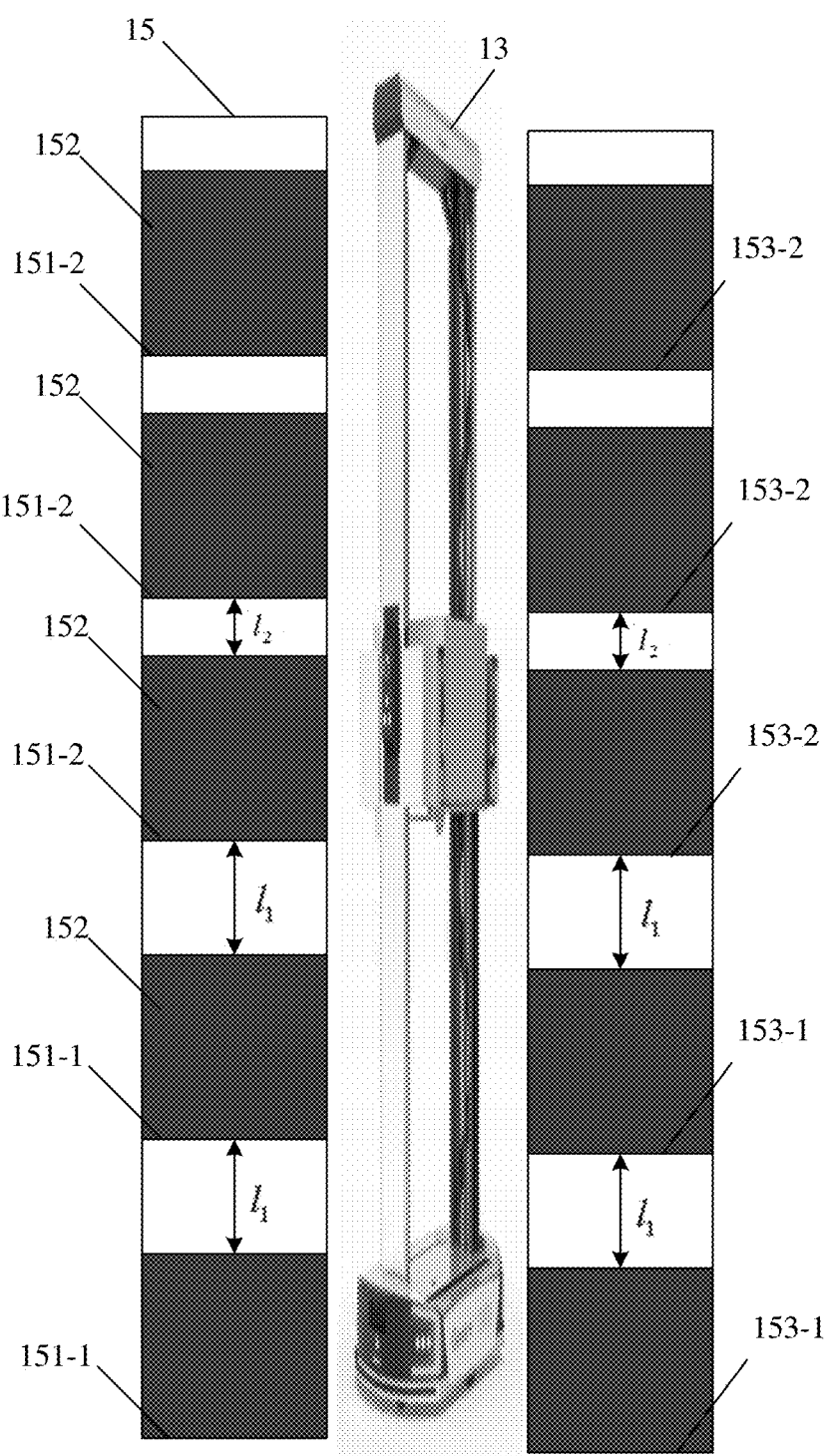
FIG. 5 illustrates a schematic diagram of distribution of different storage areas on a shelf according to an embodiment of the present disclosure.

In some embodiments, in a case that the sorting robot 12 is provided with a plurality of delivery mechanisms 121, the number of the storage layers of the shelf in the first storage area 153-1 may be the same as the number of the delivery mechanisms 121. Alternatively, in a case that the delivery mechanism 121 is liftable, the number of the storage layers of the shelf in the first storage area 153-1 may be the number of the storage layers corresponding to the maximum lifting height of goods that the delivery mechanism 121 can deliver. The second storage area 153-2 includes other storage layers except the first storage area 153-1 on the shelf. Referring to FIG. 5, it illustrates a schematic diagram of distribution of different storage areas on the shelf.

The control server 14 may be configured to determine a target sorting and storage position where sorted goods are to be stored in the first storage area based on sorted goods information, dispatch the sorting robot to deliver the sorted goods into a bin corresponding to the target sorting and storage position, and in a case that a sorting task has been completed for the bin in the first storage area of the shelf, dispatch the bin transport robot to transport the bin for which the sorting task has been completed in the first storage area to an empty storage position in the second storage area.

Here, the sorted goods information may include category information, style information and the like of the sorted goods. In some embodiments, after the sorted goods are warehoused in, the system may automatically classify and process the categories and styles of sorted goods according to preset strategies.

Here, the bin that has completed the sorting task may be a bin that has completed a sorting task on an order according to the order, or a bin that has already completed a sorting task. Strategies may be set according to the application scenario to define the bin that has completed the sorting task, which is not specifically limited in this embodiment of the present disclosure.

Here, the target sorting and storage position may be any sorting and storage position 151-1 that can store the sorted goods in the first storage area 153-1. It is to be understood that, at this point, the target sorting and storage position determined by the control server may have or may not have a bin placed, which needs to be further determined by the control server. Here, the bin corresponding to the target sorting and storage position may be a bin provided at the target sorting and storage position.

In a possible embodiment, in a case that no bin is placed at the target sorting and storage position, the control server 14 may dispatch the bin transport robot 13 to transport the empty bin to the target sorting and storage position. Here, the bin transport robot 13 may transport the empty bin from the second storage area 153-2 on the shelf to the target sorting and storage position. Alternatively, it may transport the empty bin from other platforms outside the shelf, such as dedicated storage areas for empty bins, to the target sorting and storage position. Alternatively, it may transport the empty bin from other storage areas outside the sorting and storage area to the target sorting and storage position. The storage position of the empty bins may be arranged according to specific application scenarios, which will not be specifically limited in this embodiment of the present disclosure. In a case that a bin exists at the target sorting and storage position at this time, the control server may directly dispatch the sorting robot to achieve goods sorting.

In practical implementation, the control server 14 may be further configured to, after the target sorting and storage position is determined, in a case that no bin is placed at the target sorting and storage position, determine position information of an empty bin in the second storage area, and dispatch the bin transport robot to transport the empty bin from the second storage area to the target sorting and storage position based on the position information of the empty bin in the second storage area.

In an embodiment, for the returned goods sorting link in the returned goods processing process, the sorting robot is mainly used for completing the sorting operation in this link. The sorted goods may include the goods to be returned. In some embodiments, the control server 14 may be configured to determine a target sorting and storage position where the goods to be returned are to be stored in the first storage area based on sorted goods information of the goods to be returned and actual occupation information of the sorting and storage position in the first storage area, and dispatch the sorting robot to deliver the goods to be returned into the bin corresponding to the target sorting and storage position.

Here, as shown in FIG. 1, the goods sorting system further includes the item supply mechanism 16 and a picking workstation 17. Working personnel or the item supply mechanism 16 may complete goods supply to the sorting robot 12 at the picking workstation 17.

In some embodiments, by scanning the goods to be returned at the picking workstation in the warehouse, or according to a returned goods warehousing-in strategy, information such as the categories and/or styles of the goods to be returned may be determined and transmitted to the control server, and the control server may dispatch the sorting robot to pick up the goods at the item supply mechanism. Here, the sorting robot may be provided with the goods to be returned through manual item supply or conveyor line item supply. At the same time, in a case that it is determined that the corresponding categories of the goods to be returned are first sorting based on the sorted goods information of the goods to be returned, the control server may select an empty sorting and storage position as the target sorting and storage position through the actual occupation information recorded in real time of the sorting and storage position in the first storage area. Afterwards, the bin transport robot needs to be used to replenish a bin to the target sorting and storage position. In a case that it is determined that the goods to be returned are stored at a sorting and storage position A according to the historical record based on the sorted goods information of the goods to be returned, the control server determines whether the sorting task has been completed for the bin at the sorting and storage position A and the bin has been transported away or not according to the actual occupation information recorded in real time of the sorting and storage position in the first storage area. In a case that a bin exists at the sorting and storage position A, it is determined that the sorting and storage position A is the target sorting and storage position. After the target sorting and storage position where the goods to be returned are to be stored is determined, the control server may transmit an instruction to the sorting robot. Afterwards, the sorting robot may deliver the goods to be returned into the bin corresponding to the target sorting and storage position according to the position information of the target sorting and storage position transmitted by the control server and information of a path for moving to the target sorting and storage position, and upload delivery information to the control server to complete this sorting task. Afterwards, the above process may be repeated until all sorting tasks are completed.

In another embodiment, for the sorting link of the goods to be picked in the order processing process, the sorting operation in this link is mainly completed by the bin transport robot together with the sorting robot. The sorted goods may include the goods to be picked. As shown in FIG. 1, the goods sorting system further includes the item supply mechanism 16 and the picking workstation 17. Working personnel or the item supply mechanism 16 may complete goods supply to the sorting robot 12 at the picking workstation 17. In some embodiments, the control server 14 may be configured to determine initial position information of the goods to be picked based on sorted goods information of the goods to be picked, dispatch the bin transport robot to transport a bin where the goods to be picked are located to the item supply mechanism based on the initial position information, dispatch the item supply mechanism to place the goods to be picked onto the sorting robot, and dispatch the sorting robot to deliver the goods to be picked into the bin corresponding to the target sorting and storage position.

Here, the initial position information may include one or more of position information of a storage position 151-2 in the second storage area 153-2 and other areas outside the sorting and storage area 11.

In some embodiments, after it is determined to pick the goods in the order, in a case that it is determined that the corresponding categories of the goods to be picked are first sorting based on the sorted goods information of the goods to be picked, the control server may select the empty sorting and storage position as the target sorting and storage position according to the actual occupation information recorded in real time of the sorting and storage position in the first storage area. Afterwards, the control server transmits the position information of the target sorting and storage position to the bin transport robot, and controls the bin transport robot to replenish a bin to the target sorting and storage position. The bin transport robot transports the empty bin stored in the second storage area to the target sorting and storage position, binds the target sorting and storage position with the information of the empty bin, and feeds back the information to the control server after completion. In a case that it is determined that the goods to be returned are stored at a sorting and storage position B according to the historical record based on the sorted goods information of the goods to be picked, the control server determines whether the sorting task has been completed for the bin at the sorting and storage position B and the bin has been transported away or not according to the actual occupation information recorded in real time of the sorting and storage position in the first storage area. In a case that the bin exists at the sorting and storage position B, it is determined that the sorting and storage position B is the target sorting and storage position. Afterwards, the initial position information of the goods to be picked may be determined according the sorted goods information of the goods to be picked in the order. Here, the initial position of the goods to be picked may include storage positions provided in the second storage area on the shelf, other platforms outside the shelf, and other storage areas outside the sorting and storage area. The bin transport robot may be used to transport the bin corresponding to the goods to be picked from the initial position of the goods to be picked to the item supply mechanism. Afterwards, the control server may dispatch the sorting robot to move to the item supply mechanism. The control server transmits an instruction to the item supply mechanism. The item supply mechanism places the goods to be picked onto the sorting robot according to the instruction. Afterwards, the sorting robot may deliver the goods to be picked into the bin corresponding to the target sorting and storage position according to the position information of the target sorting and storage position transmitted by the control server and information of a path for moving to the target sorting and storage position to complete this sorting task. Afterwards, the above process may be repeated until all sorting tasks are completed.

After the sorted goods are delivered to the sorting and storage position in the first storage area, in a possible embodiment, the bin transport robot may be used to store the bin that has already completed the sorting task at the sorting and storage position. For details, please refer to the following embodiments:

In example 1, a bin C that has already completed a sorting task at the sorting and storage position is shelved on for storage, which may be sorted and stored on the same shelf. In some embodiments, the bin C at the sorting and storage position on the shelf is stored at an empty storage position in the second storage area of the shelf.

In example 2, a bin C that has already completed a sorting task at the sorting and storage position is shelved on for storage, which may be sorted and stored on different shelves. In some embodiments, the bin C at the sorting and storage position on a shelf Q1 is stored at an empty storage position in the second storage area of a shelf Q2.

In example 3, a bin C that has already completed a sorting task at the sorting and storage position is shelved off for storage, which may be transported to a platform outside the shelf for unified storage.

In example 4, a bin C that has already completed a sorting task at the sorting and storage position is shelved off for storage, which may be transported to other storage areas outside the sorting and storage area for unified storage. In some embodiments, the bin C is transported to other storage areas outside the sorting and storage area for operation of the next step. For example, for order sorting, it may be directly warehoused out; for the goods to be destroyed in the returned goods sorting process, the bin C may be directly transported to other storage areas outside the sorting and storage area for destruction.

After the bin transport robot is used to store the bin that has already completed the sorting task at the sorting and storage position, the control server 14 may be further configured to, in a case that it is determined to replenish a bin to an empty sorting and storage position in the first storage area, dispatch the bin transport robot to transport an empty bin from the second storage area to the sorting and storage position to which the bin is to be replenished in the first storage area.

In some embodiments, the case of determining to replenish a bin to the empty sorting and storage position in the first storage area may include the follows: while the bin transport robot transports away the bin that has already completed the sorting task from the sorting and storage position, it may be determined as the case of determining to replenish a bin to the empty sorting and storage position in the first storage area; in a case that the control server determines that no bin exists at the target sorting and storage position in response to a sorting request, it may be determined as the case of determining to replenish a bin to the target sorting and storage position in the first storage area.

In some embodiments, the bin transport robot may be used to complete the storage and acquisition tasks of the bin at the sorting and storage position. After the bin at the sorting and storage position has completes an assigned sorting task, the control server transmits the position information of the sorting and storage position where the bin is located and the position information of the empty storage position in the second storage area to the bin transport robot. After the bin transport robot acquires the position information of the sorting and storage position and the position information of the empty storage position in the second storage area, it firstly moves to the sorting and storage position to acquire the bin, and then moves to the empty storage position in the second storage area to store the bin at the storage position. The control server automatically determines whether there is a sorting task at the sorting and storage position or not. If so, it transmits the position information of the empty bin to the bin transport robot. After the position information of the empty bin is received, the bin transport robot moves to the position of the empty bin and moves the empty bin to the sorting and storage position. The above process is repeated until all sorting tasks are completed.

In a possible embodiment, the control server 14 may be further configured to, in a case that it is determined to perform a shelving-on operation on a bin outside the shelf, dispatch the bin transport robot to transport the bin outside the shelf to the empty storage position in the second storage area. Here, the case of determining to perform a shelving-on operation on the bin outside the shelf may include the follows: the case of warehousing in the goods to be picked in the order, where warehousing-in refers to shelving-on for storage; in some embodiments, the empty bin is shelved on for storage, so as to complete the subsequent task of replenishing a bin to the sorting and storage position.

In an embodiment, before sorting the sorted goods, it is also required to perform warehousing-in processing. For the scenario of warehousing in the goods to be picked in order sorting, before the goods to be picked are formally sorted, the bin transport robot is used to perform shelving-on for storage on the goods to be picked. The shelf here refers to a shelf with a sorting and storage position. In this embodiment of the present disclosure, by integrating the split warehousing-in and sorting links in the sorting scenarios, that is, using the sorting robot to realize sorting of goods and using the bin transport robot to realize warehousing-in of goods, the sorting efficiency of the overall sorting process can be improved. In practical implementation, the control server firstly determines the initial position information of the bin to be warehoused-in where the goods to be picked are located and the position information of the empty storage position in the second storage area where it is to be stored, and assigns a task of warehousing in the goods to be picked to the bin transport robot (i.e., shelving-on for storage). After receiving the task of warehousing in the goods to be picked, based on the initial position information of the bin to be warehoused-in where the goods to be picked are located and the position information of the empty storage position in the second storage area where it is to be stored, the bin transport robot moves the bin where the goods to be picked are located from the initial position to the empty storage position in the second storage area where it is to be stored, thus completing the task of warehousing in the goods to be picked.

In an embodiment, the empty bin is shelved on for storage. In practical implementation, the control server firstly determines the initial position information of the empty bin and the position information of the empty storage position in the second storage area where the goods are to be stored, and transmits the initial position information of the empty bin and the position information of the empty storage position in the second storage area where the goods are to be stored to the bin transport robot. After receiving the initial position information of the empty bin and the position information of the empty storage position in the second storage area where the goods are to be stored, the bin transport robot transports the empty bin to the empty storage position in the second storage area where the goods are to be stored, thus completing the task of shelving on the empty bin for storage.

In a possible embodiment, the control server 14 may be further configured to, in a case that it is determined that a bin to be shelved-off exists in the shelf, dispatch the bin transport robot to transport the bin to be shelved-off to a position outside the shelf.

Here, the bin to be shelved-off may include a bin to be warehoused-out on the shelf. In the sales warehousing-out link, the bin transport robot is mainly used to complete the warehousing-out of the goods to be warehoused-out in this link. Here, the goods to be warehoused-out are stored in the bin to be shelved-off. In an embodiment, the bin to be shelved-off may be located at the sorting and storage position in the first storage area. For the goods to be warehoused-out after order sorting is completed, it may be directly shelved off and warehoused out in the first storage area on the shelf. In another embodiment, the bin to be shelved-off may be located at the storage position in the second storage area. For the goods to be warehoused-out after order sorting is completed, the bin transport robot may be used to firstly shelve on and store the bin that has already completed the sorting task at the storage position in the second storage area. Then, in a case it is determined to warehouse out the goods in the order, the bin transport robot is used to acquire the bin where the goods to be warehoused-out are located from the storage position in the second storage area and transport it to the position outside the shelf.

In some embodiments, in a case that there is a sales warehousing-out task, the control server may automatically locate the position of the bin to be shelved-off where the goods to be warehoused-out are located according to the information of the goods to be warehoused-out, and assign the sales warehousing-out task to the bin transport robot. After receiving the sales warehousing-out task, the bin transport robot moves to the position of the bin to be shelved-off to acquire the bin where the goods to be destroyed are located, and transport the bin to the exit of the sorting and storage area. The bin after sales warehousing-out is transferred to the next logistics link, which is usually for warehoused-out goods collection and temporary storage or direct loading and shipping.

In some embodiments, in the destruction warehousing-out link, the bin transport robot is mainly used to complete the warehousing-out of the goods to be destroyed in this link. In a case that the goods in the bin cannot meet the requirements for resales, during inventory sorting or destruction warehousing-out, the bin transport robot automatically shelves off the bin to be shelved-off. Here, goods to be destroyed are stored in the bin to be shelved-off and the bin to be shelved-off is located at the storage position in the second storage area. In some embodiments, the control server 14 may be configured to, in a case that it is determined to destroy the goods to be destroyed, determine position information of the bin to be shelved-off where the goods to be destroyed are located; dispatch the bin transport robot to transport the bin to be shelved-off to other storage areas outside the sorting and storage area based on the position information of the bin to be shelved-off.

In some embodiments, during inventory sorting, the control server may automatically locate the position of the bin to be shelved-off where the goods to be destroyed are located according to the information of the goods to be destroyed, and assign a destruction task to the bin transport robot. After receiving the destruction task, the bin transport robot moves to the position of the bin to be shelved-off to acquire the bin where the goods to be destroyed are located, and transport the bin to the exit of the sorting and storage area for processing in the next link, such as destruction. The above process is repeated until all destruction tasks are completed.

To sum up, by dispatching the sorting robot and the bin transport robot to integrate split links in the sorting scenarios, that is, using the sorting robot to realize sorting of goods and using the bin transport robot to realize warehousing-in, shelving-on, storage, shelving-off and warehousing-out of goods, the sorting efficiency of the overall sorting process can be improved. In some embodiments, the bin transport robot is used as an automatic storage and acquisition device for sorting goods, which can automatically transport the bin at the sorting and storage position of the shelf to the storage position in the second storage area of the shelf, and can also replenish the empty bin in the second storage area of the shelf to the sorting and storage position in the first storage area of the shelf, thus completing the handover between the sorting link and the storage link. The sorting robot is used as a device for returned goods sorting and order sorting. The sorting robot queues up at the picking station, and the working personnel at the picking station directly supplies the sorted goods to the sorting robot, thus saving the intermediate handover process, that is, integrating the item supply actions in returned goods picking and returned goods sorting into one, and integrating the item supply actions in order picking and order sorting into one.

Further, the control server dispatches the sorting robot and the bin transport robot separately, thus achieving the automation of various links of the sorting process, reducing the difficulty of warehouse management and further improving the sorting efficiency of goods.

Further, the sorting robot and the bin transport robot can be used in the same sorting and storage area to complete the above sorting process, thus avoiding the situation that the returned goods sorting scenario occupies part of warehouse area exclusively, i.e., the sorting and storage area, and reducing the logistics cost of returned goods sorting.

Based on the concept of the goods sorting system, an embodiment of the present disclosure further provides a robot. It may be considered that the robot includes the sorting robot in the above embodiment. For the schematic structural diagrams of the sorting robot, please refer to FIG. 4a or FIG. 4b. For the work tasks performed by the sorting robot, please refer to the tasks performed by the sorting robot mentioned above, which will not be repeated here.

Figure 6A:
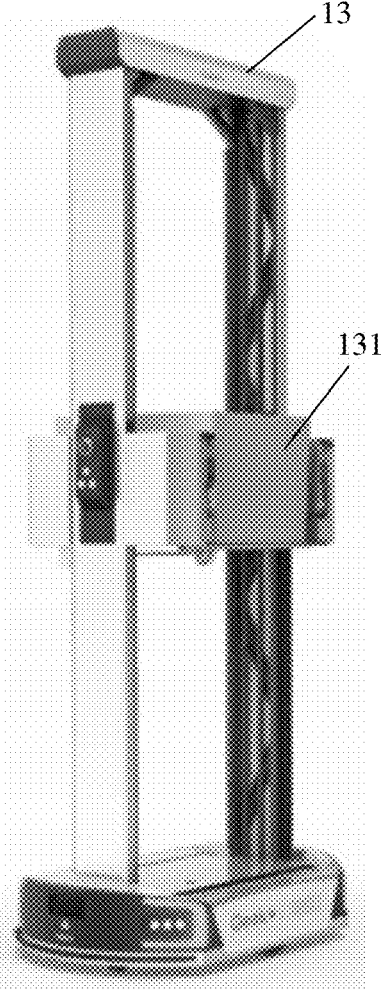
FIG. 6a illustrates a schematic structural diagram of a bin transport robot according to an embodiment of the present disclosure.
Figure 6B:
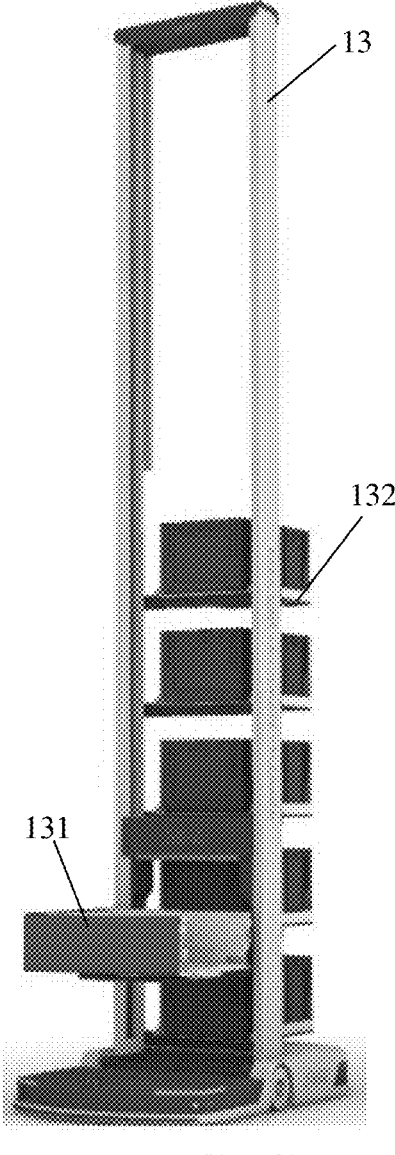
FIG. 6b illustrates a schematic structural diagram of another bin transport robot according to an embodiment of the present disclosure.

Based on the concept of the system, an embodiment of the present disclosure further provides a robot. It may be considered that the robot includes the bin transport robot in the above embodiment. For the schematic structural diagram of the bin transport robot, please refer to FIG. 6a. The bin transport robot includes a bin holding mechanism 131 for grabbing the bin. For the schematic structural diagram of the bin transport robot, please refer to FIG. 6b. The bin transport robot 13 includes the bin holding mechanism 131 and a temporary storage mechanism 132. The bin holding mechanism 131 is used for grabbing the bin. The temporary storage mechanism 132 is used for temporarily storing the bin. For the work tasks performed by the bin transport robot, please refer to the tasks performed by the bin transport robot mentioned above, which will not be repeated here.

Based on the concept of the system, an embodiment of the present disclosure further provides a goods sorting method. Below is a detailed introduction to the goods sorting method according to this embodiment of the present disclosure.

An execution subject of the goods sorting method according to this embodiment of the present disclosure is generally a computer device with certain computing power, such as a control server. In some possible embodiments, the control server of the goods sorting method may be implemented by a processor by calling computer-readable instructions stored in a memory. The goods sorting method according to this embodiment of the present disclosure will be described below, by taking the execution subject being a computer device as an example.

A goods sorting method, which is applied to the control server in the goods sorting system, includes:

determining the target sorting and storage position where the sorted goods are to be stored in the first storage area based on sorted goods information;

dispatching the sorting robot to deliver the sorted goods into the bin corresponding to the target sorting and storage position; and in a case that the sorting task has been completed for the bin in the first storage area of the shelf, dispatching the bin transport robot to transport the bin for which the sorting task has been completed in the first storage area to the empty storage position in the second storage area.

In some embodiments, the goods sorting method further includes:

in a case that it is determined to replenish a bin to an empty sorting and storage position in the first storage area, dispatching the bin transport robot to transport the empty bin from the second storage area to the sorting and storage position to which the bin is to be replenished in the first storage area.

In some embodiments, the goods sorting method further includes:

in a case that it is determined to perform a shelving-on operation on the bin outside the shelf, dispatching the bin transport robot to transport the bin outside the shelf to the empty storage position in the second storage area.

In some embodiments, the goods sorting method further includes:

in a case that it is determined that the bin to be shelved-off exists in the shelf, dispatching the bin transport robot to transport the bin to be shelved-off to the position outside the shelf.

In some embodiments, the sorted goods include the goods to be returned; and the goods sorting method includes:

determining the target sorting and storage position where the goods to be returned are to be stored in the first storage area based on sorted goods information of the goods to be returned and actual occupation information of the sorting and storage position in the first storage area; and dispatching the sorting robot to deliver the goods to be returned into the bin corresponding to the target sorting and storage position.

In some embodiments, the sorted goods include the goods to be picked; the goods sorting before determining the target sorting and storage position where the sorted goods are to be stored in the first storage area based on sorted goods information, the method further includes:

determining initial position information of the goods to be picked based on sorted goods information of the goods to be picked;

dispatching the bin transport robot to transport the bin where the goods to be picked are located to the item supply mechanism based on the initial position information; and dispatching the item supply mechanism to place the goods to be picked onto the sorting robot.

In some embodiments, the initial position information includes one or more of position information of the storage position in the second storage area and other areas outside the sorting and storage area.

In some embodiments, the goods sorting method further includes:

after the target sorting and storage position is determined, in a case that no bin is placed at the target sorting and storage position, determining position information of an empty bin in the second storage area; and dispatching the bin transport robot to transport the empty bin from the second storage area to the target sorting and storage position based on the position information of the empty bin in the second storage area.

In some embodiments, the bin to be shelved-off contains goods to be destroyed; the bin to be shelved-off is located at a storage position in the second storage area; and in a case that it is determined that a bin to be shelved-off exists in the shelf, the dispatching the bin transport robot to transport the bin to be shelved-off to the position outside the shelf includes:

in a case that it is determined to destroy the goods to be destroyed, determining position information of the bin to be shelved-off where the goods to be destroyed are located; and dispatching the bin transport robot to transport the bin to be shelved-off to other storage areas outside the sorting and storage area based on the position information of the bin to be shelved-off.

In some embodiments, the bin to be shelved-off includes the bin to be warehoused-out on the shelf.

In some embodiments, the first storage area includes the bottommost storage area of the shelf; and the second storage area includes other storage areas except the bottommost storage area of the shelf.

An embodiment of the present disclosure further provides a computer-readable storage medium storing computer-readable instructions, and when the instructions in the storage medium are executed by a processor, the goods sorting method in the above embodiment is implemented.

An embodiment of the present disclosure further provides a computer program product including computer program codes, and when the computer program codes run on a computer, the goods sorting method in the above embodiment is executed.

An embodiment of the present disclosure provides a computer program including computer program codes, and when the computer program codes run on a computer, the computer executes the goods sorting method in the above embodiment.

All embodiments of the present disclosure may be executed separately or in combination with other embodiments, all of which are considered within the scope of the protection of the present disclosure.

What is claimed is:

1. A goods sorting system, comprising:
a sorting robot;
a bin transport robot;
a sorting and storage area, wherein the sorting and storage area is provided with at least one shelf; wherein the shelf comprises at least one storage position, with the storage position being configured for storing a bin; wherein the shelf comprises a first storage area and a second storage area, with the first storage area being provided with a sorting and storage position; and
a control server, wherein the control server is configured to determine, based on sorted goods information, a target sorting and storage position in the first storage area which is configured to store sorted goods, dispatch the sorting robot to complete a sorting task to deliver the sorted goods into a bin corresponding to the target sorting and storage position, and in a case that the sorting task for a bin in the first storage area of the shelf has been completed, dispatch the bin transport robot to transport the bin in the first storage area for which the sorting task has been completed to an empty storage position in the second storage area of the shelf,
wherein the sorted goods comprise goods to be picked; the goods sorting system further comprises an item supply mechanism;
wherein the control server is further configured to determine initial position information of the goods to be picked based on sorted goods information of the goods to be picked, dispatch the bin transport robot to transport a bin containing the goods to be picked to the item supply mechanism based on the initial position information, and dispatch the item supply mechanism to place the goods to be picked onto the sorting robot;
wherein the initial position information comprises at least one of the following: position information of a storage position in the second storage area or an area other than the sorting and storage area.

2. The goods sorting system according to claim 1, wherein the control server is further configured to, in a case that bin replenishment is determined for an empty sorting and storage position in the first storage area, dispatch the bin transport robot to transport an empty bin from the second storage area to the empty sorting and storage position in the first storage area for which bin replenishment is determined.

3. The goods sorting system according to claim 1, wherein the control server is further configured to, in a case that a bin outside the shelf needs to undergo a shelving operation, dispatch the bin transport robot to transport the bin outside the shelf to an empty storage position in the second storage area.

4. The goods sorting system according to claim 1, wherein the control server is further configured to, in a case that a bin in the shelf is determined to be removed from the shelf, dispatch the bin transport robot to transport the bin to be removed from the shelf to a position outside the shelf.

5. The goods sorting system according to claim 4, wherein the bin to be removed from the shelf contains goods to be destroyed; the bin to be removed from the shelf is located at a storage position in the second storage area; and
wherein the control server is configured to, in a case that the goods to be destroyed is determined to be destroyed, determine position information of the bin to be removed from the shelf in which the goods to be destroyed are located, and dispatch the bin transport robot to transport the bin to be removed from the shelf to a storage areas other than the sorting and storage area based on the position information of the bin to be removed from the shelf.

6. The goods sorting system according to claim 4, wherein the bin to be removed from the shelf comprises a bin on the shelf that is to be dispatched from a warehouse.

7. The goods sorting system according to claim 1, wherein the sorted goods comprise goods to be returned; and
wherein the control server is configured to determine, based on sorted goods information of the goods to be returned and actual occupancy information of sorting and storage positions in the first storage area, a target sorting and storage position in the first storage area where the goods to be returned are to be stored, and dispatch the sorting robot to deliver the goods to be returned into a bin corresponding to the target sorting and storage position.

8. The goods sorting system according to claim 1, wherein the control server is further configured to:
after determining the target sorting and storage position, determine, in a case that no bin is placed at the target sorting and storage position, position information of an empty bin in the second storage area, and dispatch the bin transport robot to transport the empty bin from the second storage area to the target sorting and storage position based on the position information of the empty bin in the second storage area.

9. The goods sorting system according to claim 1, wherein the first storage area comprises a bottommost storage area of the shelf; and the second storage area comprises a storage area other than the bottommost storage area of the shelf.

10. A goods sorting method, applied to the control server of the goods sorting system according to claim 1, the goods sorting method comprising:
determining, based on sorted goods information, the target sorting and storage position which is configured to store sorted goods;
dispatching the sorting robot to deliver the sorted goods into the bin corresponding to the target sorting and storage position; and
in a case that the sorting task for a bin in the first storage area of the shelf has been completed, dispatching the bin transport robot to transport the bin in the first storage area for which the sorting task has been completed to the empty storage position in the second storage area;
wherein the sorted goods comprise goods to be picked; the goods sorting system further comprises an item supply mechanism; and before determining the target sorting and storage position in the first storage area where the sorted goods are to be stored based on sorted goods information, the goods sorting method further comprises:

determining initial position information of the goods to be picked based on sorted goods information of the goods to be picked;

dispatching the bin transport robot to transport a bin containing the goods to be picked to the item supply mechanism based on the initial position information; and dispatching the item supply mechanism to place the goods to be picked onto the sorting robot, wherein the initial position information comprises one or more of position information of a storage position in the second storage area and an area other than the sorting and storage area.

11. The goods sorting method according to claim 10, wherein the goods sorting method further comprises:

in a case that bin replenishment is determined for an empty sorting and storage position in the first storage area, dispatching the bin transport robot to transport an empty bin from the second storage area to the empty sorting and storage position in the first storage area;

in a case that a bin outside the shelf needs to undergo a shelving operation, dispatching the bin transport robot to transport the bin outside the shelf to an empty storage position in the second storage area;

dispatching the bin transport robot to transport the bin to be removed from the shelf to a position outside the shelf in a case that it is determined that a bin to be removed from the shelf exists in the shelf.

12. The goods sorting method according to claim 11, wherein the bin to be removed from the shelf contains goods to be destroyed; the bin to be removed from the shelf is located at a storage position in the second storage area; and the dispatching the bin transport robot to transport the bin to be removed from the shelf to the position outside the shelf in a case that it is determined that the bin to be removed from the shelf exists in the shelf comprises:

in a case that the goods to be destroyed is determined to be destroyed, determining position information of the bin to be removed from the shelf in which the goods to be destroyed are located; and dispatching the bin transport robot to transport the bin to be removed from the shelf to a storage area other than the sorting and storage area based on the position information of the bin to be removed from the shelf.

13. The goods sorting method according to claim 11, wherein the bin to be removed from the shelf comprises a bin on the shelf that is to be dispatched from a warehouse.

14. The goods sorting method according to claim 10, wherein the sorted goods comprise goods to be returned; and the goods sorting method comprises:

determining, based on sorted goods information of the goods to be returned and actual occupancy information of sorting and storage positions in the first storage area, a target sorting and storage position in the first storage area where the goods to be returned are to be stored; and dispatching the sorting robot to deliver the goods to be returned into a bin corresponding to the target sorting and storage position.

15. The goods sorting method according to claim 10, wherein the goods sorting method further comprises:

after determining the target sorting and storage position, determining, in a case that no bin is placed at the target sorting and storage position, position information of an empty bin in the second storage area; and dispatching the bin transport robot to transport the empty bin from the second storage area to the target sorting and storage position based on the position information of the empty bin in the second storage area.

16. The goods sorting method according to claim 10, wherein the first storage area comprises a bottommost storage area of the shelf; and the second storage area comprises a storage area other than the bottommost storage area of the shelf.

17. A non-transitory computer-readable storage medium storing computer-readable instructions, wherein when the instructions in the storage medium are executed by a processor, the goods sorting method according to claim 10 is implemented.

18. A goods sorting system, comprising:

a sorting robot;

a bin transport robot;

a sorting and storage area, wherein the sorting and storage area is provided with at least one shelf; wherein the shelf comprises at least one storage position, with the storage position being configured for storing a bin; wherein the shelf comprises a first storage area and a second storage area, with the first storage area being provided with a sorting and storage position; wherein the second storage area comprises other storage layers except the first storage area on the shelf, and storage positions in the second storage area are configured to store bins and/or sorted goods that have completed the sorting task; and a control server, wherein the control server is configured to: determine, based on sorted goods information, a target sorting and storage position in the first storage area which is configured to store sorted goods; after determining the target sorting and storage position, determine, in a case that no bin is placed at the target sorting and storage position, position information of an empty bin in the second storage area; dispatch the bin transport robot to transport the empty bin from the second storage area to the target sorting and storage position based on the position information of the empty bin in the second storage area; and in a case that the sorting task for a bin in the first storage area of the shelf has been completed, dispatch the bin transport robot to transport the bin in the first storage area for which the sorting task has been completed to an empty storage position in the second storage area of the shelf.

\*    \*    \*    \*    \*